March 16, 1954

W. B. LESLIE ET AL 2,672,154

PRESSURE REGULATOR

Filed June 9, 1949

INVENTORS
William B. Leslie &
BY Orear K. Neville

Roland A. Anderson

ATTORNEY

Patented Mar. 16, 1954

2,672,154

UNITED STATES PATENT OFFICE 2,672,154

PRESSURE REGULATOR

William B. Leslie, Clovis, N. Mex., and Orear K. Neville, Oak Ridge, Tenn., assignors to the United States of America as represented by the United States Atomic Energy Commission Application June 9, 1949, Serial No. 98,144

4 Claims. (Cl. 137—253)

Our invention relates to pressure regulators and more particularly to a liquid medium pressure regulator for use in connection with chemical reactions and systems.

In the prior art of pressure regulation in chemical systems, it has been customary to use diaphragms as the pressure regulating medium. However, diaphragms are open to numerous disadvantages which limit both their usefulness and life. They are subject to corrosion, breakage, fatigue failure, and attack from acids and many other chemicals. In addition, it is difficult to regulate the diaphragm to the proper pressure and maintain a high degree of accuracy.

Applicants with a knowledge of all these defects in and objections to the prior art, have for an object of their invention the provision of a pressure regulator which is easy to set and which will function over long periods of time without material variation or necessity for maintenance or adjustment.

Applicants have as another object of their invention the provision of a pressure regulator which may be easily and quickly adjusted and which is substantially free from failure.

Applicants have as a further object of their invention the provision of a pressure regulator which is corrosion resistant and which will withstand the attacks of acids and other chemicals.

Applicants have as a still further object of their invention the provision of a pressure regulator which eliminates the need for moving parts and the wear and breakage incident to their use and which is reliable in its results.

Other objects and advantages of our invention will appear from the following specification and accompanying drawings and the novel features thereof will be particularly pointed out in the annexed claims.

Figure 1:
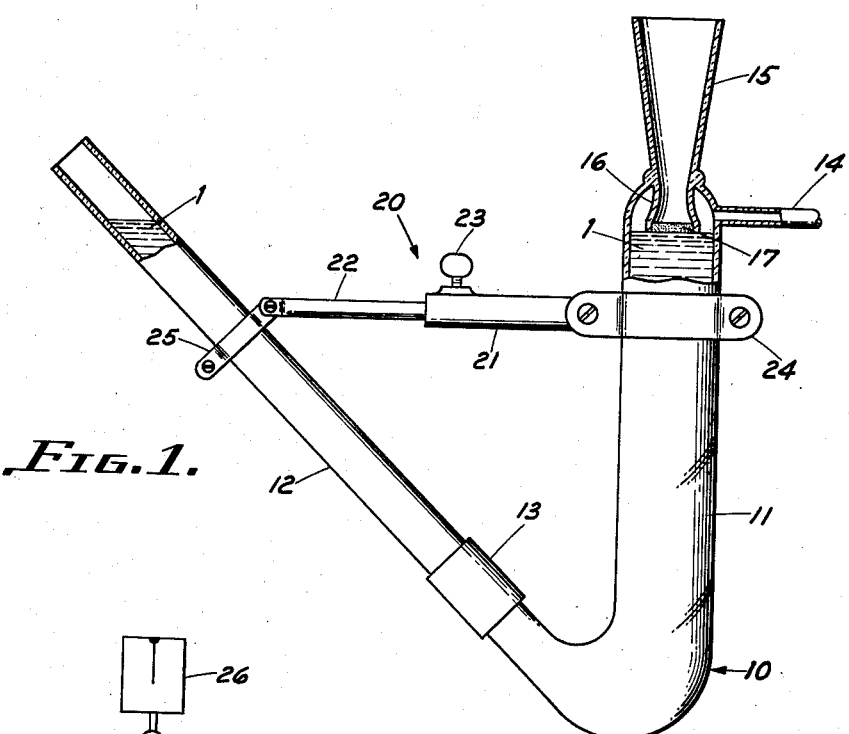
Figure 2:
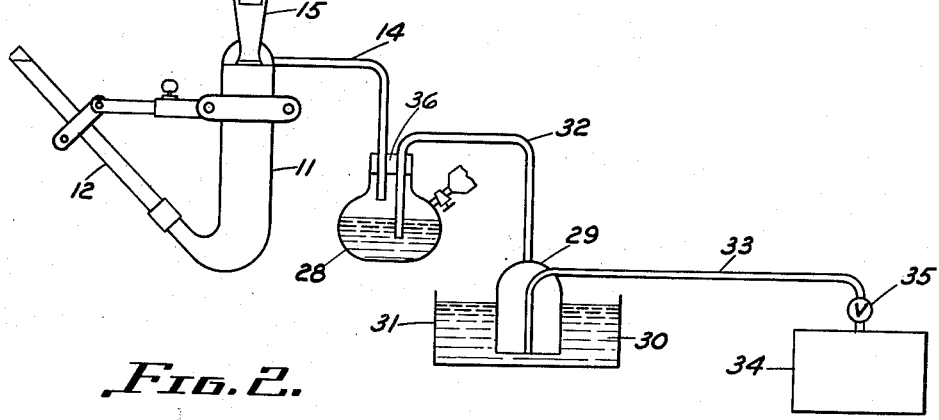

In the drawings, Fig. 1 is a side elevation, partly in section, of a preferred form of our improved pressure regulator. Fig. 2 is a schematic of a system in which our improved pressure regulator may be used.

Referring to the drawings in detail and particularly to Fig. 1, the pressure regulator takes the general form of a monometer tube, and is indicated at 10 as having a vertical leg 11, and a leg 12 preferably of a reduced diameter which is normally at an angle with respect to the vertical leg 11, being connected thereto through the lower shank portion thereof. The leg 12 is made in two parts coupled through a flexible coupling 13 of rubber, tygon or other appropriate material which telescopes over the adjacent end portions thereof to provide a bendable leg.

The angular leg 12 is open to the atmosphere at the upper free end and a liquid 1 such as mercury, in the two legs of the regulator normally stands at very nearly the same level. The pressure above the liquid in angular leg 12 is atmospheric since it is open to the air, while the pressure above the liquid in the vertical leg 11 may be normally maintained at or close to that of the atmosphere, particularly where the upper end of the nipple 15 is open to the atmosphere. That is, the hydraulic head in vertical leg 11, plus the pressure above the liquid in that leg, will balance the hydraulic head in the angular leg 12, plus atmospheric pressure.

The upper portion of the leg 11 connects through a tube or extension 14 to the source of gas pressure which is to be regulated. Extending downwardly through the upper end of leg 11 and held or sealed thereto is a tapered nipple member 15 having a throat portion 16 with its lower end positioned substantially at the level of the liquid in the leg. The opening at the lower end of nipple 15 lies in a plane parallel to the surface of the liquid, and this opening is preferably closed by a porous ceramic disk 17 which is seated therein. The disk 17 is impervious to the passage of mercury or other balancing liquid of the regulator but is pervious to the passage of gas therethrough to the tube 14.

Obviously the level of liquid in leg 11 is determined by the difference between the pressure in tube 14 and atmospheric pressure, and on the position of leg 12 which is angularly adjustable through the rubber coupling 13 as described more in detail hereinafter, since pressure is determined by the equation P=HD, where P—is the pressure.
H—is the difference in the vertical heights of the liquid columns, and
D—is the density of the liquid used in the regulator.

In operation, wherever the pressure in tube 14, acting on the exposed surface of mercury or other liquid in leg 11 around throat 16, is sufficient to depress the level in this leg down below the disk 17, gas will be permitted to pass upwardly through the disk and to escape through the nipple 15. This, of course, will reduce the pressure in tube 14, rebalancing the liquid columns and maintaining pressure in the tube 14 at a desired value.

The angular portion of the leg 12 is adjustable, as pointed out above, whereby the pressure which is maintained in the tube 14 can be adjusted, that is, to raise thre columns and increase the pressure or lower the columns and decrease the pressure. The parts of the leg 12 are secured in an adjustable bracket, generally designated 20. The bracket 20 bridges the space between the upper part of leg 11 and the upper part of leg 12 and comprises an inner portion 22 and an outer portion 21 telescopically engaged and maintained in adjusted relation by a thumb screw 23 which passes through the outer member 21, and adjustably seats in a screw threaded socket therein.

The end of the inner portion 22 is permitted to freely slide within the outer portion 21 but may be maintained in adjusted position by tightening the thumb screw 23 to cause its inner end to engage the inner portion 22 of the bracket and clamp it against the wall of the outer portion 21. This cross member or bracket is secured in place on the arms 11 and 12 of the regulator by conventional expansible two part clamps 24 and 25 which snugly surround and engage their respective legs 11, 12. They are maintained in tight engagement with these legs by means of screws which pass through them and tighten or loosen the clamp.

When the angular leg 12 is raised to a higher or more nearly vertical position, it will be observed that the liquid level in this leg will rise and the liquid level in the vertical leg 11 will also rise. Thus, a higher pressure in tube 14 will be required to depress the mercury or liquid level sufficiently in the leg 11 to cause release of pressure through the disk 17, and the device will regulate at a slightly higher pressure, depending upon the adjustment of the leg 12. However, if the leg 12 is adjusted to a lower position, the opposite is true. In short, the device controls the pressure in tube 14 and maintains it at a value above atmospheric by an amount depending upon the angular position of the leg 12.

While the above regulator may be employed in a variety of systems for regulating pressure, one specific application which is somewhat different from the general type referred to above, is indicated in the abbreviated system of Fig. 2. In the system of this figure, where collateral elements have been omitted for the sake of simplicity, it is proposed to fill the ionization chamber 26 to atmospheric pressure with a gas to be examined, as for example carbon dioxide containing $C_{14}$. The ionization chamber 26, after being evacuated to the desired vacuum pressure, is placed in the system, and the valve 27 serves to control the communication of the chamber with nipple 15 of the pressure regulator. Tube 14 of the regulator is then connected to a reaction vessel or chamber 28 which is fed by hooded or bell jar 29 having its lower open mouth submerged in a suitable liquid 30, such as mercury, in container 31. The upper outlet of the jar 29 communicates with the reaction chamber 28 through tube 32 which passes through a stopper seal 36 in the mouth of the chamber, while a gas line 33 is fed from tank 34 through valve 35.

In the operation of filling ionization chamber 26, gas such as normal carbon dioxide under pressure in tank 34 is released through valve 35 and passes out through line 33 to a point beneath the surface of liquid 30 in vessel or container 31. It then bubbles up through the liquid into the upper portion of the jar 29. This arrangement serves to reduce the pressure of the gas from that of tank pressure to that of slightly above atmospheric pressure. Then, the opening of valve 27 brings the vacuum of chamber 26 into communication with the jar 29 and this would have the effect of drawing the liquid from the bath 30 up into the jar 29 and the reaction chamber 28. However, this tendency is overcome by the insertion of the pressure regulator into the system.

In the reaction vessel or chamber 28, a reaction such as the assaying of $C_{14}$ by the wet combustion process may be taking place. Organic samples for radioactivity determinations may be converted to carbon dioxide by a modification of the wet oxidation method developed by Van Slyke, Folch and Plazin. See Journal Biological Chem. (1940) 136, 509. The sample (3-8 mg.) mixed with 200-400 mg. of potassium iodate can be treated with 10-15 ml. of the Van Slyke combustion solution until all of the sample has disappeared. This may be accomplished in about five to ten minutes. The activated carbon dioxide released passes up through the line 14 to the pressure regulator, and through nipple 15 and valve 27 to the ionization chamber 26. Some gas, such as inactive carbon dioxide, from tank 34 was allowed to pass through line 33 from storage tank or reservoir 34 and to bubble slowly through the liquid 30 during the combustion in chamber 28. Thereafter, valve 35 is opened to a greater extent so that gas from reservoir 34 is permitted to sweep through the system at a faster rate until atmospheric pressure is attained in the ionization chamber 26. In this connection, it will be understood that with the adjustment of the regulator through the positioning of leg 12, the mercury acting as a valve will permit the passage of gas through the fritted disk 17 when the pressure in the combustion flask 28 rises above the value determined by the particular setting of the leg. Under such conditions the activated carbon dioxide gas is allowed to enter the evacuated ionization chamber 26 while the combustion is carried out at or about atmospheric pressure. Except when the pressure in line 14 is sufficiently great to depress the liquid in column 11 and expose the lower end of nipple 15, the vacuum of the ionization chamber 26 is effectively isolated from communication with jar 29 and is prevented from adversely effecting the operation of the pressure equalizing bath 30 contained in vessel or container 31. When this operation is completed and the desired pressure has been built up in ionization chamber 26, the valves 27 and 35 are closed and the ionization chamber 26 is then disconnected from the system and is ready for use.

Having thus described our invention, we claim:

1. A pressure regulator of the character described comprising a tubular body of angular configuration, a liquid disposed within the body for providing a pressure medium, means providing an inlet for the body, an outlet normally closed by said liquid, and means for changing the angular configuration of said body to alter the pressure required for displacing said liquid to bring said inlet and said outlet into communication.

2. A pressure regulator of the character described comprising a tubular body of angular configuration, an inlet opening for the body, a nipple carried by the body and providing an outlet opening, a liquid pressure medium normally covering an end of said nipple for closing the outlet opening, means for applying a critical pressure to said medium for displacing it and uncovering the end of the nipple, and means for distorting the angular configuration of the body to alter the critical pressure.

3. A pressure regulator of the character described comprising a two-part tubular body of angular configuration, a flexible coupling for joining the parts of said body together, inlet and outlet openings in said body, a liquid pressure medium for covering at least one of said openings, means for applying a critical pressure to said medium for displacing it and uncovering the openings, and means for moving the parts of the body angularly with respect to each other at the coupling to alter its configuration and said critical pressure.

4. A pressure regulator of the character described comprising a two-part tubular body portion of angular configuration, a flexible coupling for joining the parts of said body, a nipple carried by one part and extending into said body to provide an outlet opening, an inlet opening in the body adjacent the end of the nipple, a pressure medium in the body and normally closing the end of the nipple, means for transmitting a critical pressure through the inlet opening to depress the medium and uncover the end of the nipple, and means bridging the parts of the body for distorting it about said coupling to alter the critical pressure response of the medium.

WILLIAM B. LESLIE.
OREAR K. NEVILLE.

References Cited in the file of this patent

UNITED STATES PATENTS

| Number | Name | Date |
| --- | --- | --- |
| 584,445 | Winand | June 15, 1897 |
| 682,085 | Kaeferle | Sept. 3, 1901 |
| 855,801 | Moore | June 4, 1907 |
| 1,354,023 | Cornett | Sept. 28, 1920 |
| 1,369,314 | Anderson | Feb. 22, 1921 |
| 1,437,138 | Bray | Nov. 28, 1922 |
| 1,858,202 | Watkins | May 10, 1932 |
| 1,990,113 | Burghart | Feb. 5, 1935 |
| 2,134,597 | Borden | Oct. 25, 1938 |
| 2,267,594 | Lowry | Dec. 23, 1941 |
| 2,411,453 | Mitchell | Nov. 19, 1946 |
| 2,419,042 | Todd et al. | Apr. 15, 1947 |

FOREIGN PATENTS

| Number | Country | Date |
| --- | --- | --- |
| 554,516 | Germany | Feb. 11, 1927 |

OTHER REFERENCES

Warner: "Ind. and Eng. Chem. Anal. Ed.," vol. 15, pages 637, 638, October 15, 1943.

Caldwell: "Ind. & Eng. Chem. Anal. Ed.," vol. 14, page 485, June 15, 1942.